(12) United States Patent
Gokhale et al.

(10) Patent No.: US 7,975,061 B1
(45) Date of Patent: Jul. 5, 2011

(54) SYSTEM AND METHOD FOR PERFORMING MULTISTREAM STORAGE OPERATIONS

(75) Inventors: Parag Gokhale, Ocean, NJ (US); Rajiv Kottomtharayil, Ocean, NJ (US); Rahul Pawar, Ocean, NJ (US); Anand Prahlad, East Brunswick, NJ (US)

(73) Assignee: CommVault Systems, Inc., Oceanport, NJ (US)

( * ) Notice: Subject to any disclaimer, the term of this patent is extended or adjusted under 35 U.S.C. 154(b) by 941 days.

(21) Appl. No.: 11/269,520

(22) Filed: Nov. 7, 2005

Related U.S. Application Data

(60) Provisional application No. 60/626,076, filed on Nov. 8, 2004, provisional application No. 60/625,746, filed on Nov. 5, 2004.

(51) Int. Cl.
*G06F 15/16* (2006.01)
*G06F 15/173* (2006.01)

(52) U.S. Cl. ......... 709/231; 709/239; 709/240; 709/241

(58) Field of Classification Search .................. 709/231, 709/239, 240, 241
See application file for complete search history.

(56) References Cited

U.S. PATENT DOCUMENTS

| | | | |
|---|---|---|---|
| 4,296,465 A | 10/1981 | Lemak | |
| 4,445,176 A | 4/1984 | Burk et al. | |
| 4,686,620 A | 8/1987 | Ng | |
| 4,995,035 A | 2/1991 | Cole et al. | |
| 5,005,122 A | 4/1991 | Griffin et al. | |
| 5,093,912 A | 3/1992 | Dong et al. | |
| 5,133,065 A | 7/1992 | Cheffetz et al. | |
| 5,193,154 A | 3/1993 | Kitajima et al. | |
| 5,212,772 A | 5/1993 | Masters | |
| 5,226,157 A | 7/1993 | Nakano et al. | |
| 5,239,647 A | 8/1993 | Anglin et al. | |
| 5,241,668 A | 8/1993 | Eastridge et al. | |
| 5,241,670 A | 8/1993 | Eastridge et al. | |
| 5,276,860 A | 1/1994 | Fortier et al. | |
| 5,276,867 A | 1/1994 | Kenley et al. | |
| 5,287,500 A | 2/1994 | Stoppani, Jr. | |
| 5,301,351 A | 4/1994 | Jippo | |
| 5,311,509 A | 5/1994 | Heddes et al. | |

(Continued)

FOREIGN PATENT DOCUMENTS

EP 0259912 3/1988

(Continued)

OTHER PUBLICATIONS

U.S. Appl. No. 11/963,555, Gokhale.

(Continued)

*Primary Examiner* — Karen C Tang
*Assistant Examiner* — John Isom
(74) *Attorney, Agent, or Firm* — Knobbe Martens Olson & Bear, LLP

(57) ABSTRACT

Systems and methods for performing storage operations over multi-stream data paths are provided. Prior to performing a storage operation, it may be determined whether multi-streaming resources are available to perform a multi-stream storage operation. Availability of multi-streaming resources may be related to network pathways capable of supporting multi-stream storage operations, existing network load related to other storage operations being or to be performed, availability of components capable of supporting multi-stream storage operation, and other factors. If system resources to support multi-stream storage operations are not available, the system may optionally perform a traditional storage operation that does not incorporate multiple data streams.

15 Claims, 7 Drawing Sheets

U.S. PATENT DOCUMENTS

| | | |
|---|---|---|
| 5,321,816 A | 6/1994 | Rogan et al. |
| 5,333,315 A | 7/1994 | Saether et al. |
| 5,347,653 A | 9/1994 | Flynn et al. |
| 5,410,700 A | 4/1995 | Fecteau et al. |
| 5,448,724 A | 9/1995 | Hayashi |
| 5,491,810 A | 2/1996 | Allen |
| 5,495,607 A | 2/1996 | Pisello et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,598,546 A | 1/1997 | Blomgren |
| 5,615,392 A | 3/1997 | Harrison et al. |
| 5,619,644 A | 4/1997 | Crockett et al. |
| 5,638,509 A | 6/1997 | Dunphy et al. |
| 5,642,496 A | 6/1997 | Kanfi |
| 5,673,381 A | 9/1997 | Huai et al. |
| 5,675,511 A | 10/1997 | Prasad et al. |
| 5,682,513 A | 10/1997 | Candelaria et al. |
| 5,687,343 A | 11/1997 | Fecteau et al. |
| 5,699,361 A | 12/1997 | Ding et al. |
| 5,719,786 A | 2/1998 | Nelson et al. |
| 5,729,743 A | 3/1998 | Squibb |
| 5,737,747 A | 4/1998 | Vishlitzky et al. |
| 5,751,997 A | 5/1998 | Kullick et al. |
| 5,758,359 A | 5/1998 | Saxon |
| 5,761,677 A | 6/1998 | Senator et al. |
| 5,761,734 A | 6/1998 | Pfeffer et al. |
| 5,764,972 A | 6/1998 | Crouse et al. |
| 5,778,395 A | 7/1998 | Whiting et al. |
| 5,790,828 A | 8/1998 | Jost |
| 5,805,920 A | 9/1998 | Sprenkle et al. |
| 5,812,398 A | 9/1998 | Nielsen |
| 5,813,009 A | 9/1998 | Johnson et al. |
| 5,813,017 A | 9/1998 | Morris |
| 5,829,046 A | 10/1998 | Tzelnic et al. |
| 5,860,104 A | 1/1999 | Witt et al. |
| 5,875,478 A | 2/1999 | Blumenau |
| 5,887,134 A | 3/1999 | Ebrahim |
| 5,901,327 A | 5/1999 | Ofek |
| 5,924,102 A | 7/1999 | Perks |
| 5,933,104 A | 8/1999 | Kimura |
| 5,938,734 A * | 8/1999 | Yao et al. ............... 709/232 |
| 5,950,205 A | 9/1999 | Aviani, Jr. |
| 5,956,519 A | 9/1999 | Wise et al. |
| 5,970,233 A | 10/1999 | Liu et al. |
| 5,970,255 A | 10/1999 | Tran et al. |
| 5,974,563 A | 10/1999 | Beeler, Jr. |
| 5,987,478 A | 11/1999 | See et al. |
| 5,995,091 A | 11/1999 | Near et al. |
| 6,003,089 A | 12/1999 | Shaffer et al. |
| 6,009,274 A | 12/1999 | Fletcher et al. |
| 6,012,090 A | 1/2000 | Chung et al. |
| 6,021,415 A | 2/2000 | Cannon et al. |
| 6,026,414 A | 2/2000 | Anglin |
| 6,052,735 A | 4/2000 | Ulrich et al. |
| 6,076,148 A | 6/2000 | Kedem et al. |
| 6,094,416 A | 7/2000 | Ying |
| 6,105,129 A | 8/2000 | Pallmann |
| 6,122,668 A | 9/2000 | Teng et al. |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,154,852 A | 11/2000 | Amundson et al. |
| 6,161,111 A | 12/2000 | Mutalik et al. |
| 6,167,402 A | 12/2000 | Yeager |
| 6,185,607 B1 | 2/2001 | Lo et al. |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,292,783 B1 | 9/2001 | Rohler |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton et al. |
| 6,330,642 B1 | 12/2001 | Carteau |
| 6,343,324 B1 | 1/2002 | Hubis et al. |
| RE37,601 E | 3/2002 | Eastridge et al. |
| 6,356,801 B1 | 3/2002 | Goodman et al. |
| 6,374,336 B1 * | 4/2002 | Peters et al. ............... 711/167 |
| 6,389,432 B1 | 5/2002 | Pothapragada et al. |
| 6,418,478 B1 | 7/2002 | Ignatius et al. |
| 6,421,711 B1 | 7/2002 | Blumenau et al. |
| 6,487,561 B1 | 11/2002 | Ofek et al. |
| 6,487,644 B1 | 11/2002 | Huebsch et al. |
| 6,505,216 B1 * | 1/2003 | Schutzman et al. ......... 707/204 |
| 6,519,679 B2 | 2/2003 | Devireddy et al. |
| 6,538,669 B1 | 3/2003 | Lagueux, Jr. et al. |
| 6,542,909 B1 | 4/2003 | Tamer et al. |
| 6,542,972 B2 * | 4/2003 | Ignatius et al. ............. 711/154 |
| 6,564,228 B1 | 5/2003 | O'Connor |
| 6,581,143 B2 | 6/2003 | Gagne et al. |
| 6,604,149 B1 | 8/2003 | Deo et al. |
| 6,654,825 B2 | 11/2003 | Clapp et al. |
| 6,658,436 B2 | 12/2003 | Oshinsky et al. |
| 6,658,526 B2 | 12/2003 | Nguyen et al. |
| 6,732,124 B1 | 5/2004 | Koseki et al. |
| 6,886,020 B1 | 4/2005 | Zahavi et al. |
| 7,035,880 B1 | 4/2006 | Crescenti et al. |
| 7,065,623 B2 | 6/2006 | Chen et al. |
| 7,080,229 B2 | 7/2006 | Manbert et al. |
| 7,130,970 B2 | 10/2006 | Devassy et al. |
| 7,246,207 B2 | 7/2007 | Kottomtharayil et al. |
| 7,257,257 B2 * | 8/2007 | Anderson et al. ............ 382/187 |
| 7,266,132 B1 | 9/2007 | Liu et al. |
| 7,275,103 B1 | 9/2007 | Thrasher et al. |
| 7,277,984 B2 | 10/2007 | Ghosal et al. |
| 7,293,134 B1 | 11/2007 | Noland et al. |
| 7,302,522 B2 | 11/2007 | Khan et al. |
| 7,406,473 B1 * | 7/2008 | Brassow et al. ........................ 1/1 |
| 7,620,710 B2 | 11/2009 | Kottomtharayil et al. |
| 2002/0042869 A1 | 4/2002 | Tate et al. |
| 2002/0157113 A1 * | 10/2002 | Allegrezza ................... 725/115 |
| 2003/0099237 A1 * | 5/2003 | Mitra et al. .................. 370/393 |
| 2003/0220985 A1 | 11/2003 | Kawamoto et al. |
| 2004/0010487 A1 | 1/2004 | Prahlad et al. |
| 2005/0033800 A1 | 2/2005 | Kavuri et al. |
| 2005/0114406 A1 | 5/2005 | Dhrubajyoti et al. |
| 2005/0132257 A1 * | 6/2005 | Gold et al. .................... 714/47 |
| 2006/0010154 A1 | 1/2006 | Prahlad et al. |

FOREIGN PATENT DOCUMENTS

| | | |
|---|---|---|
| EP | 0405926 | 1/1991 |
| EP | 0467546 | 1/1992 |
| EP | 0774715 | 5/1997 |
| EP | 0809184 | 11/1997 |
| EP | 0862304 | 9/1998 |
| EP | 0899662 | 3/1999 |
| EP | 0981090 | 2/2000 |
| EP | 1174795 | 1/2002 |
| WO | WO 95/13580 | 5/1995 |
| WO | WO-95/13580 | 5/1995 |
| WO | WO 98/39707 | 9/1998 |
| WO | WO-99/12098 | 3/1999 |
| WO | WO 99/12098 | 3/1999 |
| WO | WO 99/14692 | 3/1999 |
| WO | WO 2005/055093 | 6/2005 |

OTHER PUBLICATIONS

U.S. Appl. No. 11/963,581, Gokhale.
U.S. Appl. No. 12/060,151, Attarde.
Armstead et al., "Implementation of a Campus-wide Distributed Mass Storage Service: The Dream vs. Reality," *IEEE*, 1995, pp. 190-199.
Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.
Cabrera et al., "ADSM: A Multi-Platform, Scalable, Backup and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
EITEL, "Backup and Storage Management in Distributed Heterogeneous Environments," *IEEE*, 1994, pp. 124-126.

Jander, M., "Launching Storage-Area Net," *Data Communications*, US, McGraw Hill, NY, vol. 27, No. 4 (Mar. 21, 1998), pp. 64-72.

Jason Gait, "The Optical File Cabinet: A Random-Access File System for Write-Once Optical Disks," *IEEE COMPUTER*, vol. 21, No. 6, pp. 11-22 (1988) (see in particular figure 5 in p. 15 and recitation in claim 5).

Rosenblum et al., "The Design and Implementation of a Log-Structured File System," *Operating Systems Review SIGOPS*, vol. 25, No. 5, New York, US, pp. 1-15 (May 1991).

Armstead, et al. "Implementation of a Campus-Wide Distributed Mass Storage Service: The Dream vs. Reality," IEEE, 1995, pp. 190-199.

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Arneson, David A., Control Data Corporation, Development of Omniserver; Mass Storage Systems, 1990, pp. 88-93.

Cabrera, et al. "ADSM: A Multi-Platform, Scalable, Backup and Archive Mass Storage System," Digest of Papers, Compcon '95, Proceedings of the 40th IEEE Computer Society International Conference, Mar. 3, 1995-Mar. 9, 1995, pp. 420-427, San Francisco, CA.

Eitel, "Backup and Storage Management in Distributed Heterogeneous Environments," IEEE, 1994, pp. 124-126.

Gait, Jason, "The Optical File Cabinet: A Random-Access File System for Write-On Optical Disks," IEEE Computer, vol. 21, No. 6, pp. 11-22 (1988) (see in particular figure 5 in p. 15 and recitation in claim 5).

Jander, M., "Launching Storage-Area Net," Data Communications, US, MCGraw-Hill, NY, vol. 27, No. 4 (Mar. 21, 1998), pp. 64-72.

Rosenblum, et al., "The Design and Implementation of a Log-Structured File System," Operating Systems Review SIGOPS, vol. 25, No. 5, New York, US, pp. 1-15 (May 1991).

\* cited by examiner

SYSTEM AND METHOD FOR PERFORMING MULTISTREAM STORAGE OPERATIONS

PRIORITY CLAIM

This application claims the benefit of U.S. provisional application No. 60/626,076 titled SYSTEM AND METHOD FOR PERFORMING STORAGE OPERATIONS IN A COMPUTER NETWORK, filed Nov. 8, 2004, and U.S. provisional application No. 60/625,746 titled STORAGE MANAGEMENT SYSTEM filed Nov. 5, 2004, each of which is incorporated herein by reference in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

RELATED APPLICATIONS

This application is related to the following patents and pending applications, each of which is hereby incorporated herein by reference in its entirety:

Application Ser. No. 09/354,058, titled HIERARCHICAL BACKUP AND RETRIEVAL SYSTEM, filed Jul. 15, 1999;

U.S. Pat. No. 6,418,478, titled PIPELINED HIGH SPEED DATA TRANSFER MECHANISM, issued Jul. 9, 2002;

Application Ser. No. 60/460,234, SYSTEM AND METHOD FOR PERFORMING STORAGE OPERATIONS IN A COMPUTER NETWORK, filed Apr. 3, 2003;

Application Ser. No. 60/482,305, HIERARCHICAL SYSTEM AND METHOD FOR PERFORMING STORAGE OPERATIONS IN A COMPUTER NETWORK, filed Jun. 25, 2003;

Application Ser. No. 60/519,526, SYSTEM AND METHOD FOR PERFORMING PIPELINED STORAGE OPERATIONS IN A COMPUTER NETWORK, filed Nov. 13, 2003;

Application Ser. No. 10/803,542, METHOD AND SYSTEM FOR TRANSFERRING DATA IN A STORAGE OPERATION, filed Mar. 18, 2004;

Application Ser. No. 11/269,512, abandoned, titled SYSTEM AND METHOD TO SUPPORT SINGLE INSTANCE STORAGE OPERATIONS, filed Nov. 7, 2005;

Application Ser. No. 11/269,514, titled METHOD AND SYSTEM OF POOLING STORAGE DEVICES, filed Nov. 7, 2005;

Application Ser. No. 11/269,521, titled METHOD AND SYSTEM FOR SELECTIVELY DELETING STORED DATA, filed Nov. 7, 2005;

Application Ser. No. 11/269,519, titled METHOD AND SYSTEM FOR GROUPING STORAGE SYSTEM COMPONENTS, filed Nov. 7, 2005;

Application Ser. No. 11/269,515, now U.S. Pat. No. 7,472,238, titled SYSTEMS AND METHODS FOR RECOVERING ELECTRONIC INFORMATION FROM A STORAGE MEDIUM, filed Nov. 7, 2005; and Application Ser. No. 11/269,513, titled METHOD AND SYSTEM FOR MONITORING A STORAGE NETWORK, filed Nov. 7, 2005.

BACKGROUND OF THE INVENTION

The invention disclosed herein relates generally to performing storage operations in a computer network. More particularly, the present invention relates to performing multiple stream storage operations from one or more subclients in a computer network.

Storage of electronic data has evolved through many forms. During the early development of the computer, storage of data was limited to individual computers. Electronic data was stored in the Random Access Memory (RAM) or some other storage medium such as a hard drive or tape drive that was an actual part of the individual computer.

Later, with the advent of networked computing, storage of electronic data gradually migrated from the individual computer to stand-alone storage devices and other storage devices accessible via a network, for example a tape library accessible via a network server or other computing device. These network storage devices soon evolved in the form of networked tape drives, libraries, optical libraries, Redundant Arrays of Inexpensive Disks (RAID), CD-ROM jukeboxes, and other devices. System administrators often use network storage devices to perform storage operations and make backup copies and other copies of data stored on individual client computers in order to preserve data against accidental loss, corruption, physical damage, and other risks.

Storage systems evolved to handle increasingly complex storage operations and increasingly large volumes of data. For example, some storage management systems began organizing system components and system resources into logical groupings and hierarchies such as storage operation cells of the CommVault QiNetix storage management system, available from CommVault Systems, Inc. of Oceanport, N.J., and as further described as further described in Application Ser. No. 60/482,305 and application Ser. No. 09/354,058 which are hereby incorporated by reference in their entirety.

In addition, other systems and methods were adopted to address performance and data transfer bottlenecks and other issues. For example, the data stream between a volume on which a storage operation, such as a backup operation, was to be performed and the intended destination for the storage operation copy of the data often presented a bottleneck and could only stream a specified amount of data at any given time. To address this issue, client volumes to be backed up, such as primary volumes, were logically subdivided and organized into portions of data, for example sub-clients as used in the QiNetix storage management system or other portions of data known in the art. Sub-clients typically represent static associations of portions of data of a volume and are mutually exclusive. Thus, a portion of data is given a label and the association is stored as a static entity in an index or other storage location used by the system. Sub-clients are also used as an effective administrative scheme of organizing data according to data type, department within the enterprise, storage preferences, etc. For example, an administrator might find it preferable to separate e-mail data from financial data using two different sub-clients having different storage preferences, retention criteria, etc.

Each individual sub-client was thereby allocated an individual data stream for performing storage operation thus increasing performance of storage operations for the entire volume. For example, if a volume was divided into four sub-clients, the volume could then be allocated four streams instead of one stream representing a theoretical fourfold increase in performance.

Despite these improvements, data from a single sub-client could only be transferred by a single stream and data transfer is still fundamentally atomic at the sub-client level. In some instances, for example, in enterprise class storage management systems storing terabytes or even petabytes of data, sub-clients are often extremely large and thus dividing a volume into additional sub-clients presented little performance advantage since the amount of data in each sub-client was still enormous.

BRIEF SUMMARY OF THE INVENTION

The system of the present invention may receive a request to perform a storage operation may determine whether multi-streaming resources are available to perform a multi-stream storage operation. Availability of multi-streaming resources may be related to network pathways capable of supporting multi-stream storage operations (for example due to bandwidth capacity, cabling topologies, or other factors), existing network load related to other storage operations being or to be performed (e.g., determining whether or not a performing a multi-stream storage operation would exceed a specified network load threshold), availability of components capable of supporting multi-stream storage operation (i.e., containing appropriate software modules, hardware, etc.), and other factors. If the check fails, or system resources to support multi-stream storage operations are otherwise not available, then the system may perform a traditional storage operation that does not incorporate multiple streams as known in the art.

Otherwise, the system may automatically identify and analyze characteristics of the portion of a sub-client on which the storage operation is to be performed. The system may analyze characteristics of the sub-client and other aspects of the storage management system as further described herein, and may use the information gathered to intelligently and dynamically create various logical subsets of the portion of data. These subsets are typically mutually exclusive and the storage operation is thus typically performed using multiple streams with a single stream directed to each individual subset of the portion of data resulting in parallelism and increased efficiency.

In some embodiments, a client data agent or other software module analyzes sub-client characteristics and other characteristics or aspects of the storage management system disclosed herein. This analysis may be performed by one or more stream managers associated with one or more media management components. In some embodiments, this analysis may be collaboratively performed by client data agents and one or more media management components or other system components such as storage management components, etc.

In some embodiments, the storage system may determine characteristics to analyze according to information stored in a storage management component index or other storage location or database. In other embodiments, the system determines characteristics to analyze according to a user preference or as manually directed or otherwise specified by a system administrator (e.g., according to default, optimized or specific selections actually made or approved by an administrator).

In some embodiments, the system may analyze sub-client characteristics according to data or sub-client size. According to one embodiment, a sub-client may be divided linearly according to the number of items. For example, a sub-client may be divided at the folder level such that an individual stream is allocated to each individual folder (or parsed into subsets of similar or equal size, depending on certain factors, for example, such as bandwidth of any associated streaming resources, required transfer time, etc.). Alternatively, a sub-client may be divided linearly among a particular number of streams. Thus, if a sub-client contains twenty folders, items, etc. and four streams have been designated for use in performing the storage operation, the system may divide the twenty items into four groups containing five items each with an individual stream used to perform the storage operation for each group.

In some embodiments, the system may also analyze and weight sub-client characteristics according to size in a non-linear manner. In some embodiments, the system may analyze sub-client characteristics according to file type. For example, it may be more suitable or efficient to process and perform certain types of storage operations on certain types of files. Thus, the system may divide a sub-client into groups according to file-type.

In some embodiments, the storage system may also identify and analyze storage network characteristics to determine how to divide sub-clients. For example, the system may analyze characteristics of the storage network such as network pathways to determine desirable pathways for various streams. The system may consider, for example, the impact of scheduled storage operations that would occur on various network pathways at the same or overlapping times as the requested storage operation to evaluate network load or other considerations such as to maintain bandwidth, throughput, etc. within various constraints or as specified by one or more thresholds. In some embodiments, the storage system may also identify and analyze storage network resources to determine how to divide sub-clients. For example, the system may evaluate the availability of one or more storage devices for performing the requested storage operation.

In some embodiments, the storage system may identify and analyze storage network resources and support sub-client multi-streaming across a plurality of storage operation cells. For example, components in a first storage operation cell may communicate with a master storage management component or other component regarding availability of transmission and storage resources in other storage operation cells. Assuming additional resources are available in other storage operation cells, the storage system may perform storage operations using multiple streams that span across multiple storage operation cells using resources in those other storage cells as further described herein.

Thus, the storage system of the present invention may identify and analyzes the various sub-client, storage network, and network resource characteristics according to various embodiments and determines the various sub-client subsets.

In operation, the storage system may create multiple streams and allocate a stream to each subset of data to perform the requested storage operation. The system may also update one or more indices with metadata and other information associated with the storage operation. For example, metadata generated and other information is generally stored in the index of the media management component responsible for processing the stream. Thus, if a single media management component processes streams for a given storage operation, the metadata generated by the storage operation may generally be stored in the index of that media management component as further described herein. The index of the storage management component associated with directing the storage operation is also generally updated indicating which media management component is responsible for the data, what data was stored, etc.

In some embodiments, however, multiple media management components may process a plurality of streams for a single sub-client storage operation, for example to load-balance a multi-stream storage operation, to perform a multi-stream storage operation across multiple storage operation cells, etc. In some embodiments, this index information may be copied to some or all media management component indices having responsibility for the storage operation. For example, if three media management components each processed one or more streams associated with a sub-client storage operation, the streaming manager or other component of a particular media management component may communicate the index information of that media management component to the other two media management components so that each (or some) of the three media management component have a complete index tracking the association of the streams of data stored on various storage devices throughout the storage management system. Alternatively, in some embodiments, once the storage operation is complete, the streaming manager or other component of two of the media management components may communicate their index information to the third media management component (thus creating a single complete copy of the metadata and other information at the third media management component) and delete or make available for overwrite their own index information, for example, to optimize index space utilized across the system. In some embodiments, a storage management component may communicate with media management components regarding the identity, address, or other identifier of other media management components in the system.

For example, if a streaming manager at a first media management component determines that insufficient resources exist (under the control of that media management component) to perform some or all of a particular storage operation, other resources may be sought to complete the contemplated operation. For example, the streaming manager may communicate this information to (e.g., as a request to other management components) and receive in return an responses indicating available resources and may include identifier information associated with another media management component (in the same or other storage operation cell) able to handle all or part of the particular storage operation including any other information necessary to coordinate the storage operation such as security or other access protocol information, firewall-related information (ports, passwords, certificates, identifiers, etc.), network pathways or other network-related information, storage device information, client information, etc. Thus, while various subsets of data may be stored on a plurality of storage devices across one or more storage operation cells, the data is easily tracked and accessible using media management component indices or other indices (such as storage manager indices in some embodiments).

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE PREFERRED EMBODIMENTS

With reference to FIGS. 1 through 7, embodiments of the invention are presented. Systems and methods are presented for performing multi-stream storage operations including multi-stream storage operations associated with a single sub-client.

Figure 1:
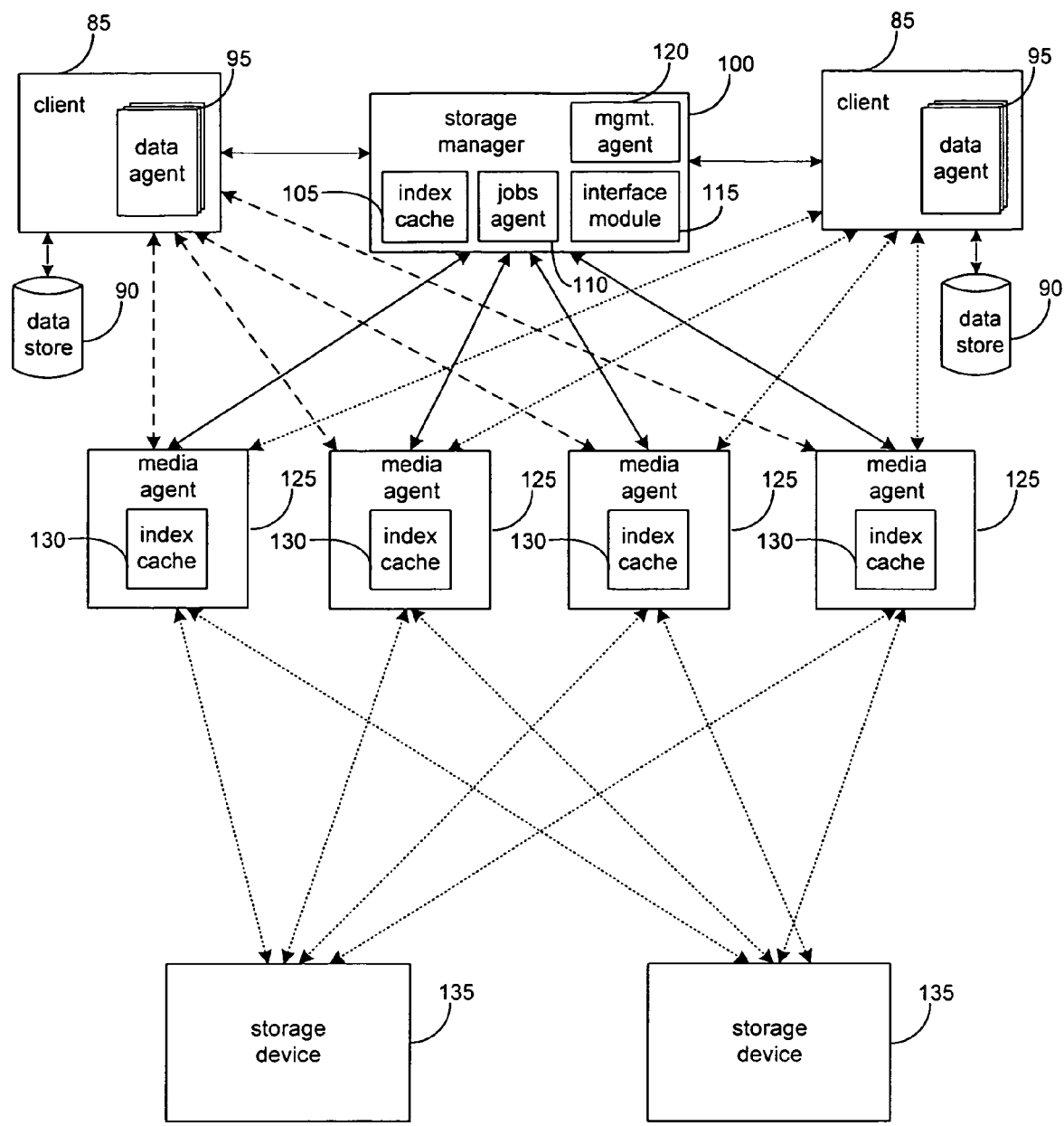
FIG. 1 is a block diagram of a storage operation cell in a system to perform storage operations on electronic data in a computer network according to an embodiment of the invention.

FIG. 1 presents a block diagram of a storage operation cell in a system to perform storage operations on electronic data in a computer network according to an embodiment of the invention. As shown, the storage operation cell may include a storage management component, such as storage manager 100 and one or more of the following: a client 85, a data store 90, a data agent 95, a media management component, such as a media agent 125, a media management component index cache 130, a storage device 135, a storage management component index cache 105, a jobs agent 110, an interface module 115, and a management agent 120. The system and elements thereof are exemplary of a modular storage management system such as the Comm Vault QiNetix storage management system, available from Comm Vault Systems, Inc. of Oceanport, N.J., and further described in application Ser. No. 09/610,738 which is incorporated herein by reference in its entirety.

A storage operation cell generally includes combinations of hardware and software components directed to performing storage operations on electronic data. Exemplary storage operation cells according to embodiments of the invention include CommCells as embodied in the QNet storage management system and the QiNetix storage management system by Comm Vault Systems of Oceanport, N.J., and as further described in Application Ser. No. 60/482,305 and application Ser. No. 09/354,058 which are hereby incorporated by reference in their entirety.

According to some embodiments of the invention, storage operations cells are related to backup cells and provide all of the functionality of backup cells as further described in application Ser. No. 09/354,058. Storage operation cells also perform additional types of storage operations and provide other types of storage management functionality. According to embodiments of the invention, storage operation cells perform storage operations which also include, but are not limited to, creation, storage, retrieval, migration, deletion, and tracking of primary or production volume data, secondary volume data, primary copies, secondary copies, auxiliary copies, snapshot copies, backup copies, incremental copies, differential copies, HSM copies, archive copies, Information Lifecycle Management ("ILM") copies, and other types of copies and versions of electronic data. In some embodiments, storage operation cells also provide an integrated management console for users or system processes to interface with to perform storage operations on electronic data as further described herein.

A storage operation cell can be organized and associated with other storage operation cells forming a logical hierarchy among various components of a storage management system as further described herein. Storage operation cells generally include a storage manager 100, and, according to some embodiments, one or more other components including, but not limited to, a client computer 85, a data agent 95, a media management component 125, a storage device 135, and other components as further described herein.

For example, a storage operation cell may contain a data agent 95 which is generally a software module that is generally responsible for performing storage operations related to client computer 85 data stored in an data store 90 or other memory location, for example archiving, migrating, and recovering client computer data. In some embodiments, a data agent performs storage operations in accordance with one or more storage policies or other preferences. A storage policy is generally a data structure or other information that may include a set of preferences and other storage criteria for performing a storage operation. The preferences and storage criteria may include, but are not limited to: a storage location, relationships between system components, network pathway to utilize, retention policies, data characteristics, compression or encryption requirements, preferred system components to utilize in a storage operation, and other criteria relating to a storage operation. As further described herein, storage policies may be stored to a storage manager index, to archive media as metadata for use in restore operations or other storage operations, or to other locations or components of the system.

Each client computer 85 generally has at least one data agent 95 and the system can support many client computers 85. The system also generally provides a plurality of data agents 95 each of which is intended to perform storage operations related to data associated with a different application, for example to backup, migrate, and recover application specific data. For example, different individual data agents 95 may be designed to handle Microsoft Exchange data, Lotus Notes data, Microsoft Windows 2000 file system data, Microsoft Active Directory Objects data, and other types of data known in the art.

If a client computer 85 has two or more types of data, one data agent 95 is generally required for each data type to perform storage operations related to client computer 85 data. For example, to backup, migrate, and restore all of the data on a Microsoft Exchange 2000 server, the client computer 85 would use one Microsoft Exchange 2000 Mailbox data agent 95 to backup the Exchange 2000 mailboxes, one Microsoft Exchange 2000 Database data agent 95 to backup the Exchange 2000 databases, one Microsoft Exchange 2000 Public Folder data agent 95 to backup the Exchange 2000 Public Folders, and one Microsoft Windows 2000 File System data agent 95 to backup the client computer's 85 file system. These data agents 95 would be treated as four separate data agents 95 by the system even though they reside on the same client computer 85. In some embodiments, separate data agents may be combined to form a virtual data agent (not shown) for performing storage operations related to a specific application. Thus, the four separate data agents of the previous example could be combined as a virtual data agent suitable for performing storage operations related to all types of Microsoft Exchange 2000 and/or Windows 2000 data.

The storage manager 100 is generally a software module or application that coordinates and controls storage operations performed by the storage operation cell. The storage manager 100 communicates with all elements of the storage operation cell including client computers 85, data agents 95, media management components 125, and storage devices 135 regarding storage operations, for example to initiate and manage system backups, migrations, and recoveries. The storage manager 100 also communicates with other storage operation cells as further described herein.

The storage manager 100 includes a jobs agent 110 software module which monitors the status of all storage operations that have been performed, that are being performed, or that are scheduled to be performed by the storage operation cell. The jobs agent 110 is communicatively coupled with an interface agent 115 software module. The interface agent 115 provides presentation logic, such as a graphical user interface ("GUI"), an application program interface ("API"), or other interface by which users and system processes can retrieve information about the status of storage operations and issue instructions to the storage operations cell regarding performance of storage operations as further described herein. For example, a user might modify the schedule of a number of pending snapshot copies or other types of copies. As another example, a user might use the GUI to view the status of all storage operations currently pending in all storage operation cells or the status of particular components in a storage operation cell.

The storage manager 100 also includes a management agent 120 software module. The management agent 120 generally provides an interface with other management components 100 in other storage operations cells through which information and instructions regarding storage operations may be conveyed. For example, in some embodiments as further described herein, a management agent 120 in first storage operation cell can communicate with a management agent 120 in a second storage operation cell regarding the status of storage operations in the second storage operation cell. In some embodiments, a management agent 120 in first storage operation cell can communicate with a management agent 120 in a second storage operation cell to control the storage manager 100 (and other components) of the second storage operation cell via the management agent 120 contained in the storage manager 100 for the second storage operation cell. In other embodiments, the management agent 120 in the first storage operation cell communicates directly with and controls the components in the second storage management cell and bypasses the storage manager 100 in the second storage management cell. Storage operation cells can thus be organized hierarchically among cells and as further described herein.

A media management component 125 is generally a software module that conducts data, as directed by a storage manager 100, between client computers 85 and one or more storage devices 135. The media management component 125 is communicatively coupled with and generally configured to control one or more storage devices 135. For example, the media management component 125 might instruct a storage device 135 to use a robotic arm or other means to load or eject a media cartridge, and to archive, migrate, or restore application specific data. The media management component 125 generally communicates with storage devices 135 via a local bus such as a SCSI adaptor. In some embodiments, the storage device 135 is communicatively coupled to the media management component 125 via a Storage Area Network ("SAN").

Each media management component 125 maintains an index cache 130 which stores index data the system generates during storage operations as further described herein. For example, storage operations for Microsoft Exchange data generate index data. Index data may include, for example, information regarding the location of the stored data on a particular media, information regarding the content of the data stored such as file names, sizes, creation dates, formats, application types, and other file-related criteria, information regarding one or more clients associated with the data stored, information regarding one or more storage policies, storage criteria, or storage preferences associated with the data stored, compression information, retention-related information, encryption-related information, stream-related information, and other types of information. Index data thus provides the system with an efficient mechanism for performing storage operations including locating user files for recovery operations and for managing and tracking stored data. The system generally maintains two copies of the index data regarding particular stored data. A first copy is generally stored with the data copied to a storage device 135. Thus, a tape may contain the stored data as well as index information related to the stored data. In the event of a system restore, the index data stored with the stored data can be used to rebuild a media management component index 130 or other index useful in performing and/or managing storage operations. In addition, the media management component 125 that controls the storage operation also may generally write an additional copy of the index data to its index cache 130. The data in the media management component index cache 130 is generally stored on faster media, such as magnetic media, and is thus readily available to the system for use in storage operations and other activities without having to be first retrieved from the storage device 135.

The storage manager 100 may also maintain an index cache 105. Storage manager index data may be, among other things, used to indicate, track, and associate logical relationships and associations between components of the system, user preferences, management tasks, and other useful data. For example, the storage manager 100 might use its index cache 105 to track logical associations between media management components 125 and storage devices 135. The storage manager 100 may also use index cache 105 to track the status of storage operations to be performed, storage patterns associated with the system components such as media use, storage growth, network bandwidth, service level agreement ("SLA") compliance levels, data protection levels, storage policy information, storage criteria associated with user preferences, retention criteria, storage operation preferences, and other storage-related information. Index caches 105 and 130 typically reside on their corresponding storage component's hard disk or other fixed storage device.

For example, jobs agent 110 of a storage manager component 100 may retrieve storage manager index 105 data regarding a storage policy and storage operation to be performed or scheduled for a particular client 85. The jobs agent 110, either directly or via the interface module 115, communicates with the data agent 95 at the client 85 regarding the storage operation. In some embodiments, the jobs agent 110 also retrieves from index cache 105 a storage policy associated with client 85 and uses information from the storage policy to communicate to data agent 95 one or more media management components 125 associated with performing storage operations for that particular client 85 as well as other information regarding the storage operation to be performed such as retention criteria, encryption criteria, streaming criteria, etc. Data agent may 95 then package or otherwise manipulate client data stored in client data store 90 in accordance with the storage policy information and/or according to a user preference, and may communicate this client data to the appropriate media management component(s) 125 for processing. Media management component(s) 125 may store the data according to storage preferences associated with the storage policy including storing the generated index data with the stored data, as well as storing a copy of the generated index data in the media management component index cache 130.

In some embodiments, components of the system may reside and execute on the same computer. In some embodiments, a client computer 85 component such as a data agent 95, a media management component 125, or a storage manager 100 coordinates and directs storage operations as further described in application Ser. No. 09/610,738. This client computer 85 component can function independently or together with other similar client computer 85 components.

Figure 2:
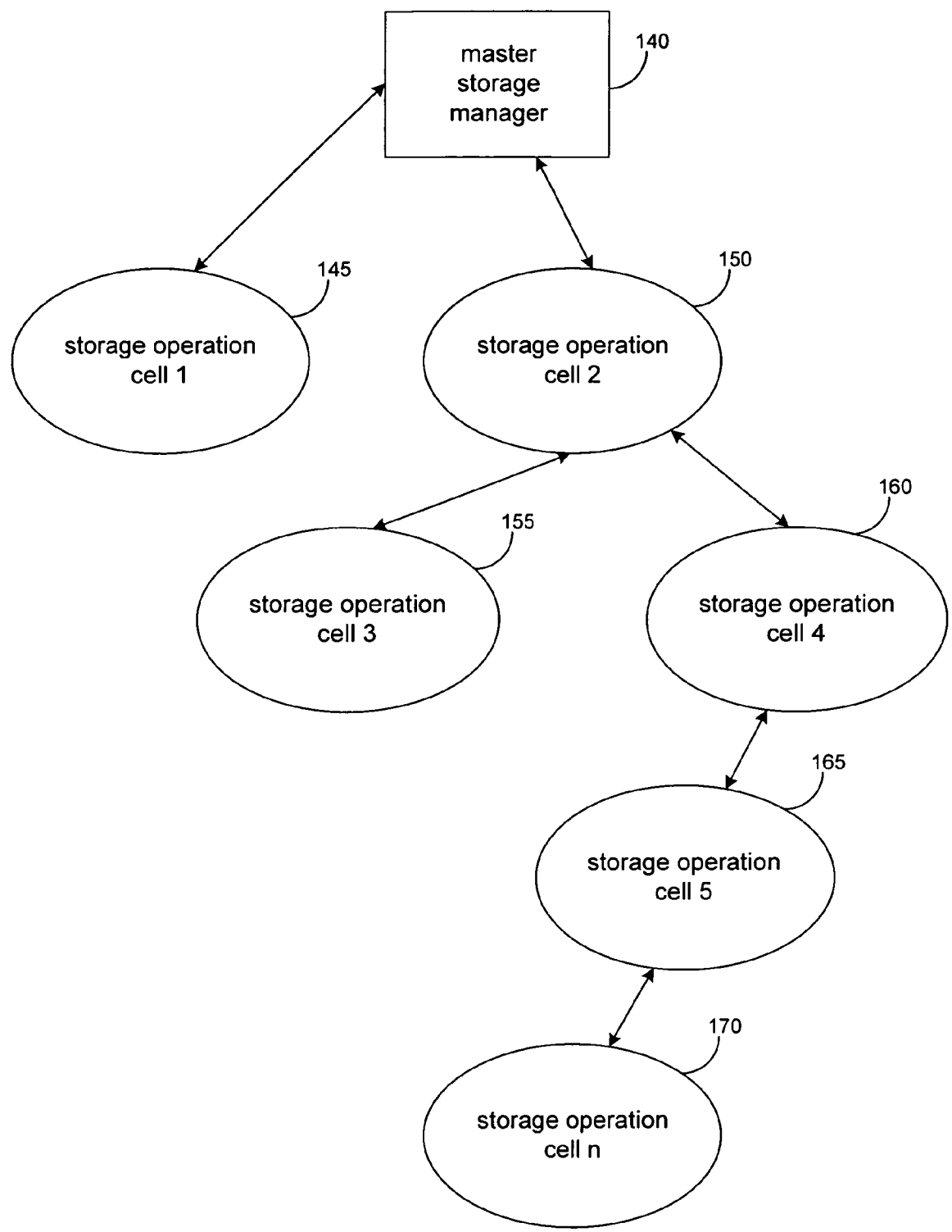
FIG. 2 is a block diagram of a hierarchically organized group of storage operation cells in a system to perform storage operations on electronic data in a computer network according to an embodiment of the invention.

FIG. 2 presents a block diagram of a hierarchically organized group of storage operation cells in a system to perform storage operations on electronic data in a computer network according to an embodiment of the invention. As shown, the system may include a master storage manager component 140, a first storage operation cell 145, a second storage operation cell 150, a third storage operation cell 155, a fourth storage operation cell 160, a fifth storage operation cell 165, and an nth storage operation cell 170.

As previously described, storage operation cells are often communicatively coupled and hierarchically organized. For example, as shown in FIG. 2, a master storage manager 140 is associated with, communicates with, and directs storage operations for a first storage operation cell 145, a second storage operation cell 150, a third storage operation cell 155, a fourth storage operation cell 160, a fifth storage operation cell 165, and an nth storage operation cell 170. In some embodiments, the master storage manager 140 is not part of any particular storage operation cell. In other embodiments (not shown), the master storage manager 140 may itself be part of a storage operation cell.

Thus, the master storage manager 140 communicates with the manager agent of the storage manager of the first storage operation cell 145 (or directly with the other components of the first cell 145) regarding storage operations performed in the first storage operation cell 145. For example, in some embodiments, the master storage manager 140 instructs the first storage operation cell 145 how and when to perform storage operations including the type of operation to perform and the data on which to perform the operation.

In other embodiments, the master storage manager 140 tracks the status of its associated storage operation cells, such as the status of jobs, system components, system resources, and other items, by communicating with manager agents (or other components) in the respective storage operation cells. In other embodiments, the master storage manager 140 tracks the status of its associated storage operation cells by receiving periodic status updates from the manager agents (or other components) in the respective cells regarding jobs, system components, system resources, and other items. For example, in some embodiments, the master storage manager 140 uses methods to monitor network resources such as mapping network pathways and topologies to, among other things, physically monitor storage operations and suggest alternate routes for storing data as further described herein. The master storage manager 140 also uses methods to monitor primary and secondary storage trends, storage status, media usage, data protection levels, and other storage-related information as further described herein.

In some embodiments, the master storage manager 140 stores status information and other information regarding its associated storage operation cells and the system in an index cache or other data structure accessible to the master storage manager 140. In some embodiments, as further described herein, the presentation interface of the master storage manager 140 accesses this information to present users and system processes with information regarding the status of storage operations, storage operation cells, system components, and other information of the system.

Storage operation cells may thus be organized hierarchically. Consequently, storage operation cells may inherit properties from "parent" or hierarchically superior cells or be controlled by other storage operation cells in the hierarchy. Thus, in some embodiments as shown in FIG. 2, the second storage operation cell 150 controls or is otherwise superior to the third storage operation cell 155, the fourth storage operation cell 160, the fifth storage operation cell 165, and the nth storage operation cell 170. Similarly, the fourth storage operation cell 160 controls the fifth storage operation cell 165, and the nth storage operation cell 170.

Storage operation cells may also be organized hierarchically according to criteria such as function (e.g., superior or subordinate), geography, architectural considerations, or other factors useful in performing storage operations. For example, in one embodiment storage operation cells are organized according to types of storage operations: the first storage operation cell 145 may be directed to performing snapshot copies of primary copy data, and the second storage operation cell 150 may be directed to performing backup copies of primary copy data or other data. In another embodiment, the first storage operation cell 145 may represent a geographic segment of an enterprise, such as a Chicago office, and a second storage operation cell 150 represents a different geographic segment, such as a New York office. In this example, the second storage operation cell 150, the third storage operation cell 155, the fourth storage operation cell 160, the fifth storage operation cell 165, and the nth storage operation cell 170 could represent departments within the New York office. Alternatively, these storage operation cells could be further divided by function performing various types of copies for the New York office or load balancing storage operations for the New York office.

In some embodiments, hierarchical organization of storage operation cells may facilitate, among other things, system security and other considerations. For example, in some embodiments, only authorized users are allowed to access or control certain storage operation cells. For example, a network administrator for an enterprise might have access to all storage operation cells including the master storage manager 140. But a network administrator for only the New York office, according to a previous example, might only satisfy access criteria to have access to the second storage operation cell 150, the third storage operation cell 155, the fourth storage operation cell 160, the fifth storage operation cell 165, and the nth storage operation cell 170 which comprise the New York office storage management system.

In some embodiments, hierarchical organization of storage operation cells facilitates storage management planning and decision-making. For example, in some embodiments, a user of the master storage manager 140 can view the status of all jobs in the associated storage operation cells of the system as well as the status of each component in every storage operation cell of the system. The user can then plan and make decisions based on this global data. For example, the user can view high-level report of summary information regarding storage operations for the entire system, such as job completion status, component availability status, resource usage status (such as network pathways, etc.), and other information. The user can also drill down through menus or use other means to obtain more detailed information regarding a particular storage operation cell or group of storage operation cells.

In other embodiments, the master storage manager 140 may alert a user or system administrator when a particular resource is unavailable (e.g., temporary or permanent) or congested. A storage device may be full or require additional media. Alternatively, a storage manager in a particular storage operation cell may be unavailable due to hardware failure, software problems, or other reasons. In some embodiments, the master storage manager 140 (or another storage manager within the hierarchy of storage operation cells) may utilize the global data regarding its associated storage operation cells at its disposal to suggest solutions to such problems when they occur or even before they occur. For example, the master storage manager 140 might alert the user that a storage device in a particular storage operation cell was full or otherwise congested, and then suggest, based on job and data storage information contained in its index cache, an alternate storage device.

As another example, in some embodiments the master storage manager 140 (or other network storage manager) contains programming directed to analyzing the storage patterns and resources of its associated storage operation cells and which suggests optimal or alternate methods of performing storage operations. Thus, for example, the master storage manager 140 may analyze traffic patterns to determine that snapshot data should be sent via a different network segment or to a different storage operation cell or storage device. In some embodiments, users can direct specific queries to the master storage manager 140 regarding predicting storage operations or regarding storage operation information.

Figure 3:
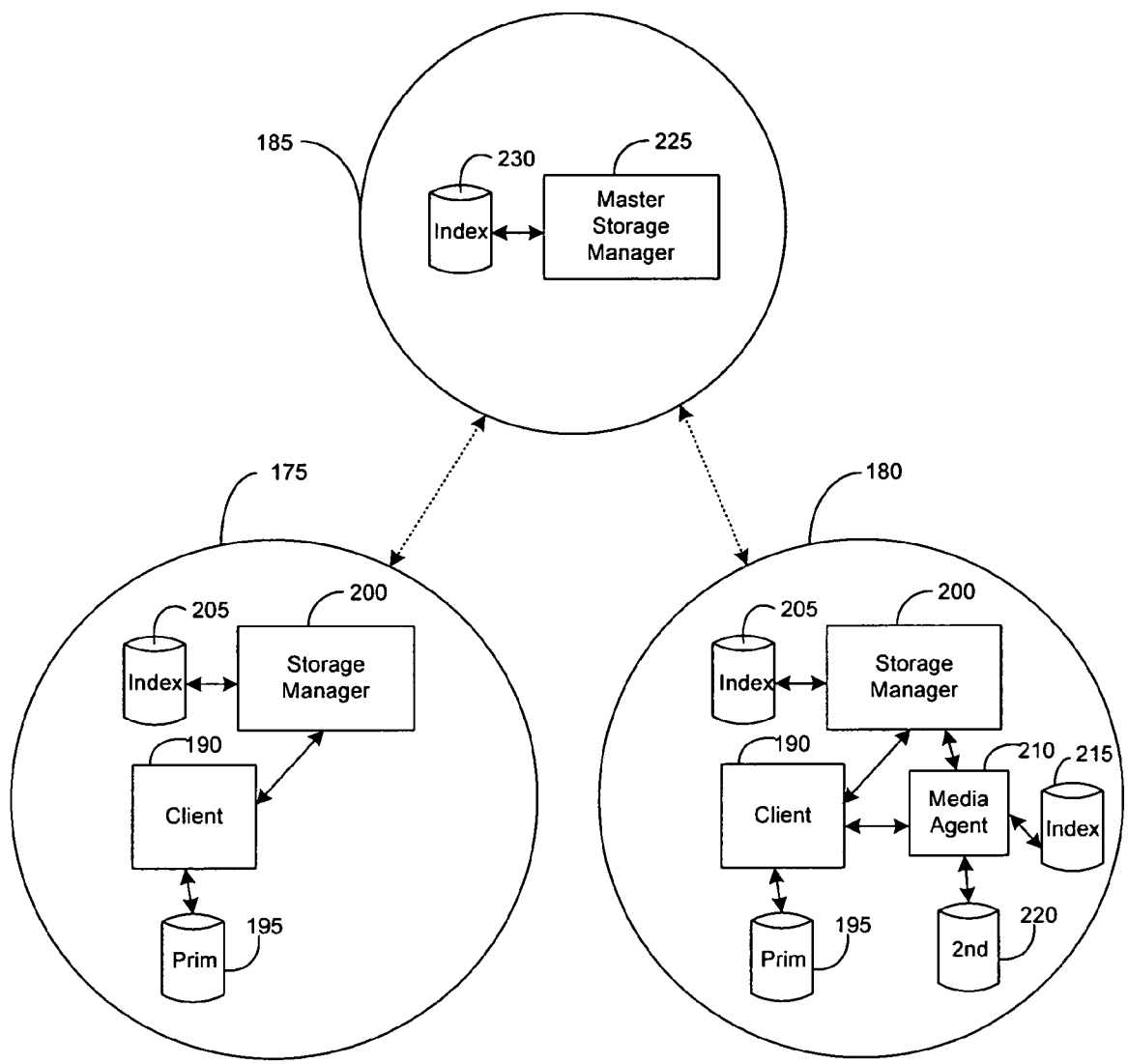
FIG. 3 is a block diagram of a hierarchically organized group of storage operation cells in a system to perform storage operations on electronic data in a computer network according to an embodiment of the invention.

FIG. 3 presents a block diagram of a hierarchically organized group of storage operation cells in a system to perform storage operations on electronic data in a computer network according to an embodiment of the invention. As shown, FIG. 3 includes a first storage operation cell 175, a second storage operation cell 180, a third storage operation cell 185, a client 190 in communication with a primary volume 195 storing production or other "live" data, a storage manager component 200 in communication with a storage manager index data store 205, a media management component 210 in communication with a media management component index 215 a secondary storage device or volume 220, and a master storage manager component 225 in communication with a master storage manager index data store 230.

According to an embodiment of the invention, the first storage operation cell 175 may be directed to a particular type storage operation, such as SRM storage operations. For example, the first storage operation cell 175 monitors and performs SRM-related calculations and operations associated with primary volume 195 data. Thus, the first storage operation cell 175 includes a client component 190 in communication with a primary volume 195 storing data. For example, the client 190 may be directed to using Exchange data, SQL data, Oracle data, or other types of production data used in business applications or other applications and stored in primary volume 195. Storage manager component 200 in cell 175 contains SRM modules or other logic directed to monitoring or otherwise interacting with attributes, characteristics, metrics, and other information associated with the data stored in primary volume 195. Storage manager 200 tracks and stores this information and other information in storage manager index 205. For example, in some embodiments, storage manager component 200 tracks the amount of available space and other similar characteristics of data associated with primary volume 195. In some embodiments, as further described herein, storage manager component 200 may also issue alerts or take other actions when the information associated with primary volume 195 satisfies certain criteria, such as alert criteria.

The second storage operation cell 180 may be directed to another type storage operation, such as HSM storage operations. For example, the second storage operation cell 180 may perform backups, migrations, snapshots, or other types of HSM-related operations known in the art. For example, in some embodiments, data is migrated from faster and more expensive storage such as magnetic storage to less expensive storage such as tape storage.

In some embodiments, storage operation cells may also contain logical groupings of the same physical devices. Thus, the second storage operation cell 180 includes the client component 190 in communication with the primary volume 195 storing data, and client component 190 and primary volume 195 in the second storage operation cell 180 are the same physical devices as the client component 190 and primary volume 195 in the first storage operation cell 175. Similarly, in some embodiments, the storage manager component 200 and index 205 in the second storage operation cell 180 are the same physical devices as the storage manager component and index in the first storage operation cell 175. The storage manager component 200, however, also contains HSM modules or other logic associated with the second storage operation cell 180 directed to performing HSM storage operations on primary volume 195 data.

The second storage operation cell 180 therefore also contains a media management component 210, a media management component index 215, and a secondary storage volume 220 directed to performing HSM-related operations on primary copy data. For example, storage manager 200 migrates primary copy data from primary volume 195 to secondary volume 220 using media management component 210. Storage manager 200 also tracks and stores information associated with primary copy migration and other similar HSM-related operations in storage manager index 205. For example, in some embodiments, storage manager component 200 directs HSM storage operations on primary copy data according to according to a storage policy associated with the primary copy 195 and stored in the index 205. In some embodiments, storage manager 200 also tracks where primary copy information is stored, for example in secondary storage 220.

The third storage operation cell 185 contains a master storage manager 225 and a master storage manager index 230. In some embodiments (not shown), additional storage operation cells might be hierarchically located between the third storage operation cell 185 and the first storage operation cell 175 or the second storage operation cell 180. In some embodiments, additional storage operation cells hierarchically superior to the third storage operation cell 185 may also be present in the hierarchy of storage operation cells.

In some embodiments, the third storage operation cell 185 is also generally directed to performing a type of storage operation, such as integration of SRM and HSM data from other storage operation cells, such as the first storage operation cell 175 and the second storage operation cell 180. In other embodiments, the third storage operation cell 185 also performs other types of storage operations and might also be directed to HSM, SRM, or other types of storage operations. In some embodiments, the master storage manager 225 of the third storage operation cell 185 aggregates and processes network and storage-related data provided by other manager components 200 in other storage operation cells 175 and 180 in order to provide, among other information, reporting information regarding particular cells, groups of cell, or the system as a whole.

Figure 4:
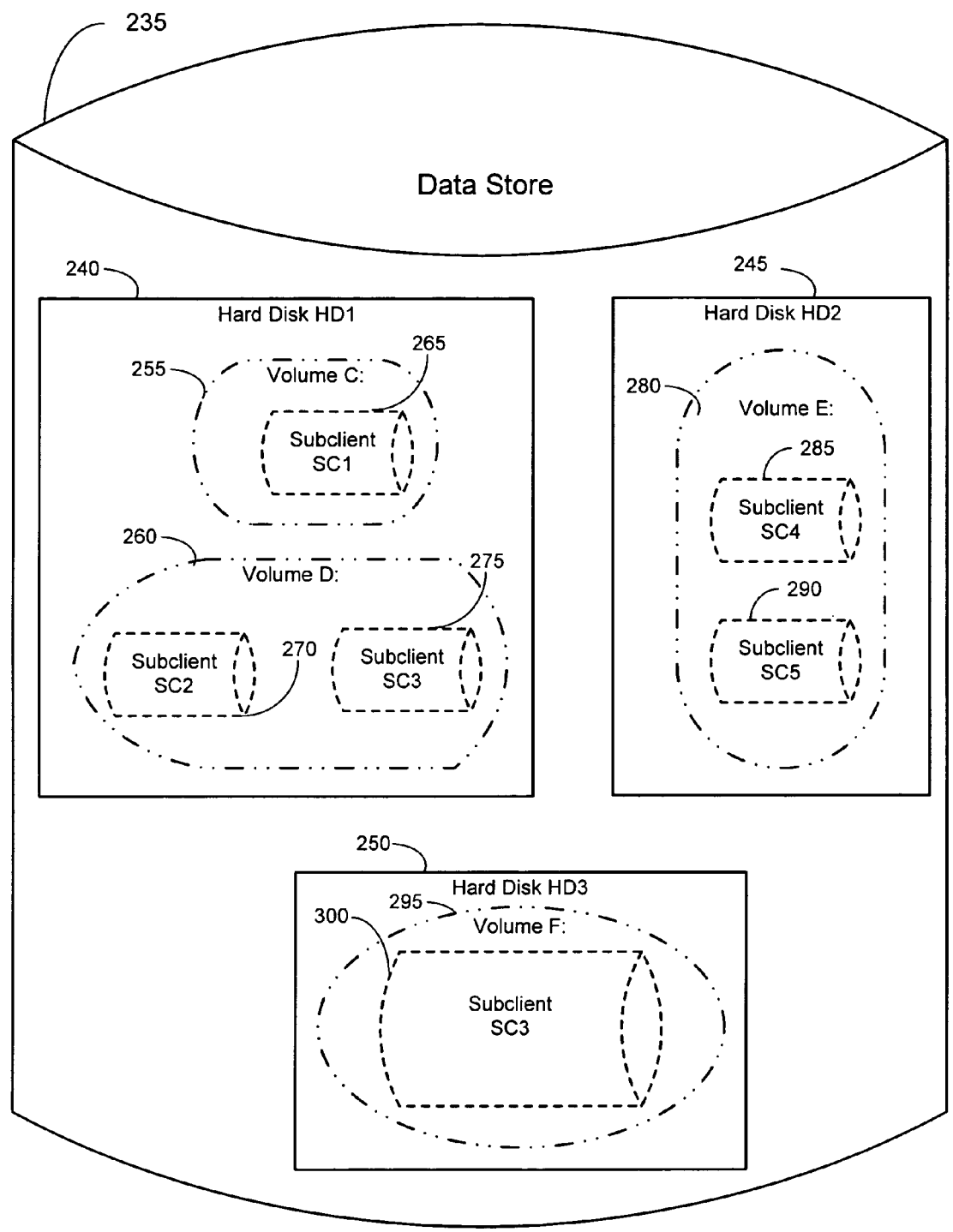
FIG. 4 is a block diagram of a client data store in a system to perform storage operations on electronic data according to an embodiment of the invention.

FIG. 4 presents a generalized block diagram of a client data store 235 in a system that performs storage operations on electronic data according to an embodiment of the invention. Data stores may include one or more hard disks or other suitable storage devices known in the art capable of storing electronic data logically organized into portions of data such as one or more volumes and/or sub-clients. As shown, client data store 235 may include hard disks HD1 240, and HD2 245, and an nth hard disk HD3 250. Hard disk 240 is logically divided into a number of volumes and sub-clients including volume C: 255, all of which is included in sub-client SC1 265, and volume D: 260, the entirety of which is divided into two portions of data represented by sub-client SC2 270 and sub-client SC3 275. Hard disk 245 contains a volume E: 280, the entirety of which is divided into two portions of data represented by sub-client SC4 285 and sub-client SC5 290. An nth hard disk, depicted as HD3 250, stores its electronic data on a volume F: 295, all of which is included in sub-client SC3 300.

Figure 5:
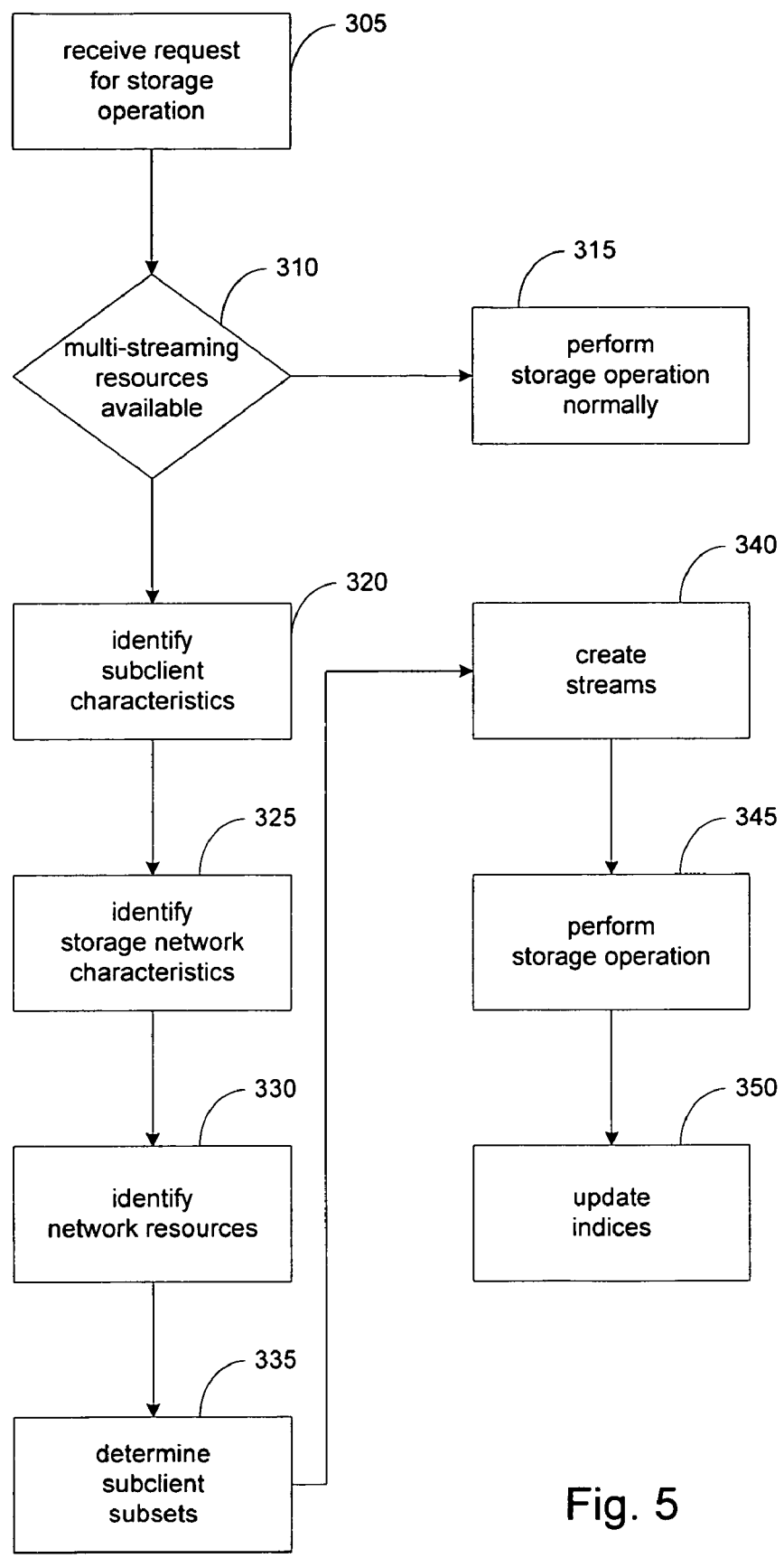
FIG. 5 is a flow diagram of a method for performing multi-stream storage operations on electronic data according to an embodiment of the invention.

FIG. 5 presents a flow diagram of a method for performing multi-stream storage operations on electronic data according to an embodiment of the invention. The system receives or otherwise generates as described herein a request to perform a storage operation at step 305. For example, a storage management component may schedule or otherwise direct a client or other system component regarding performance of a storage operation, such as a storage operation associated with a storage policy stored in a storage management component index. Thus, a storage manager management agent may communicate storage policy information and other storage preferences with a client data agent regarding the storage operation, for example, identifying the electronic data and sub-client storing the electronic data on which the storage operation should be performed, identifying one or more media management components for the storage operation, identifying one or more storage devices to used for the storage operation or indicating that the identified one or more media management components will identify one or more storage devices to be used for the storage operation, indicating whether the storage operation can be performed using multiple streams, describing how the electronic data should be stored, for example, as compressed or encrypted electronic data, indicating a specified time period to retain the electronic data on the storage device(s), etc.

Assuming the request to perform a storage operation does not prohibit a multi-stream storage operation, the system may determine whether multi-streaming resources are available to perform a multi-stream storage operation, step 310. Availability of multi-streaming resources may be related to network pathways capable of supporting multi-stream storage operations (e.g., due to bandwidth capacity, cabling topologies, available routing options, or other factors), existing and/or predicted network load related to other storage operations being or to be performed (e.g., determining whether or not a performing a multi-stream storage operation would exceed a specified network load threshold), availability of components capable of supporting multi-stream storage operation (i.e., containing appropriate software modules, hardware, etc.), and any other factors that contribute to transmission of data.

For example, a storage manager, a stream manager, or other system component may perform one or more a diagnostic or discovery tests or checks to determine that one or more network pathways used by a particular storage policy is capable of supporting multi-stream storage operations and that components used to perform the storage operation associated with the storage policy are capable of supporting, handling and processing multi-stream storage operations. If the test or check fails, or system resources to support multi-stream storage operations are otherwise not available or scheduled to be unavailable, the system may perform a traditional storage operation that does not incorporate multiple streams as known in the art, step 315.

In some embodiments, the test may be deemed "failed" if all the necessary resources to perform the multi-stream storage operation are unavailable (or scheduled to be unavailable). However, in other embodiments, the storage system may identify certain missing resources and identify other constraints (e.g., time or scheduling) and provide options for obtaining necessary resources or provide the user with option to proceed with operation even though the test has strictly "failed." This may involve manual intervention or override and may be performed automatically in an emergency or priority situation. For example, a network load or time threshold may be exceeded based on the proposed storage operation, or an operation of less priority may be "bumped" or rescheduled, but the user may instruct the system to proceed anyway. Moreover, in an emergency situation, it may be desirable to attempt storage operations even if only a portion of data will likely be successfully copied.

Otherwise, the system may automatically identify and analyze characteristics of the portion of sub-client on which the storage operation is to be performed, step 320. One reason this offers a significant advantage over prior art is because the system of the present invention is able to perform a storage operation on single sub-client using multiple streams. The system may analyze characteristics of the sub-client and other aspects of the storage management system as further described herein, and may use the information gathered to intelligently and dynamically create various logical subsets of the portion of data. These subsets of the portion of data are typically mutually exclusive and the storage operation may thus be performed using multiple streams with a single stream directed to each individual subset of the portion of data resulting in parallelism and increased efficiency.

In some embodiments, a client data agent or other software module analyzes sub-client characteristics and other characteristics or aspects of the storage management system. In other embodiments, this analysis may be performed by one or more stream managers associated with one or more media management components. For example, stream managers associated with different media management components may communicate regarding characteristics of one or more sub-clients and/or characteristics or aspects of the storage management system. In some embodiments, this analysis is collaboratively performed by client data agents and one or more media management components or other system components such as storage management components, etc.

In some embodiments, the system of the present invention may determine characteristics to analyze according to information stored in a storage management component index or other storage location. For example, the system may contain a data structure or other information specifying a set of sub-client and storage management system characteristics to analyze. In other embodiments, the system determines characteristics to analyze according to a user preference or as manually directed or otherwise specified by a system administrator.

In other embodiments, the system analyzes sub-client characteristics according to size. A sub-client generally contains a plurality of items such as files, folders, or other organizational divisions. According to one embodiment, a sub-client may be divided linearly according to the number of items. For example, a sub-client may be divided at the folder level such that an individual stream is allocated to each individual folder. Alternatively, a sub-client may be divided linearly among a particular number of streams. Thus, if a sub-client contains twenty folders, items, etc. and four streams have been designated for use in performing the storage operation, the system may divide the twenty items into four groups containing five items each with an individual stream used to perform the storage operation for each group.

Sub-client items, however, may vary greatly in size. A sub-client with twelve folders may contain a single folder storing 50% of the data of the entire sub-client, and it may be inefficient to linearly divide the sub-client and allocate streams in such a scenario. Thus, the system may also analyze and employing a scaling factor to "weight" sub-client characteristics according to size in a non-linear manner. Using the previous example, if the system had only four streams available for use in performing a storage operation associated with the sub-client, the system may divide the single folder storing 50% of the sub-client data into two groups (for example into two groups of files by analyzing the contents of the folder at the file size to create two groups of relatively equal size) allocating an individual stream for each group, and divide the remaining six folders into two groups of three folders each with an individual stream used to perform the storage operation for each group.

In some embodiments, the system analyzes sub-client characteristics according to file type. For example, it may be more suitable or efficient to process and perform certain types of storage operations on certain types of files. Thus, the system may divide a sub-client into groups according to file-type. For example, a storage operation could take twice as long to perform for a first file type than for a second file type. If a sub-client contained twelve folders, with six folders storing data of the first file type and six folders storing an equal amount of data of the second file type, the system might allocate three streams to the sub-client by dividing the first six folders storing data of the first file type into two groups of three folders each with an individual stream allocated to each group, and associating the remaining six folders into a third group with an individual stream allocated to the third group. Thus, the storage operation for the sub-client would finish at approximately the same time for all streams.

In some embodiments, the system also identifies and analyzes storage network characteristics, step 325, to determine how to divide sub-clients. For example, the system may analyze characteristics of the storage network such as network pathways to determine desirable pathways for various streams. The system may consider, for example, the impact of scheduled storage operations that would occur on various network pathways at the same time as the requested storage operation of step 305 to evaluate network load or other considerations in order to maintain bandwidth, etc. within various constraints or a specified threshold.

Other considerations may include analyzing bandwidth of the transmission paths. If, for example, three streaming paths are available, one of which has twice the bandwidth of the other two, a sub-client may be divided correspondingly (e.g., into three parts, one part which may be twice the size of the other two) such that data is transferred form the sub-client to the destination storage device over substantially the same time period. In other embodiments, data may be divided according to priority, with more sensitive data being divided from less important data in the sub-client, with the sensitive data being assigned priority in order of transfer, bandwidth, security, etc., irrespective of size.

In some embodiments, the system also identifies and analyzes storage network resources, step 330, to determine how to divide sub-clients. For example, the system may evaluate the availability of one or more storage devices for performing the requested storage operation of step 305. It would be inefficient to allocate more streams to a sub-client storage operation than available storage device resources could support at a given time.

In some embodiments, the system may identify and analyze storage network resources that supports sub-client multi-streaming across a plurality of storage operation cells. For example, the system may determine that resources in a first cell only support a certain number of streams (for example due to concurrent usage by other storage operations, device failures/unavailability, media space, etc.) that is less than a specified or desirable number of streams for the requested storage operation of step 305. Thus, components in the first storage operation cell may communicate with a master storage management component or other component regarding availability of storage resources in additional storage operation cells. Assuming additional resources were available in other storage operation cells, the system may perform the requested storage operation of step 305 using multiple streams across multiple storage operation cells as further described herein.

Thus, as can be seen from the above, the system identifies and analyzes the various sub-client, storage network, and network resource characteristics according to various embodiments and determines the various sub-client subsets, step 335.

In operation, the system may create multiple streams and allocate a stream to each subset of data, step 340, and perform the requested storage operation, step 345. For example, the system may create an instance of a high speed data transfer mechanism supporting multiple streams such as a data pipe as further described in U.S. Pat. No. 6,418,478 to transfer the data chunk-by-chunk to the designated storage device(s). Chunks of data from each subset of data are encapsulated and streamed as payload along with tag header and footer metadata describing the contents of each chunk as further described in application Ser. No. 09/495,751, and in application Ser. No. 10/803,542.

For example, metadata may include information including the sub-client associated with the chunk of data, the relationship of the chunk of data to other chunks of data from the sub-client (for example the order in which the chunks should be arranged, etc.), the date and time the data was generated, retention criteria associated with the data, encryption criteria associated with the data (e.g., a public key associated with the data, etc.), application-specific criteria associated with the data, a list of files contained in the chunk of data, the identity of the storage device on which the data is stored, the location of the data on the storage device (for example a tape offset, a sector, etc.), and other information. This metadata is generally stored with the chunks at the storage device in order to facilitate restore operations, disaster recovery operations, and other storage operations.

The system may also update one or more indices with metadata and other information associated with the storage operation, step 350. For example, metadata generated and other information is generally stored in the index of the media management component responsible for processing the stream. Thus, if a single media management component processes all streams for a given storage operation, the metadata generated by the storage operation is generally stored in the index of that media management component as further described herein. The index of the storage management component associated with directing the storage operation is also generally updated indicating which media management component is responsible for the data, what data was stored, etc.

In some embodiments, however, multiple media management components may process a plurality of streams for a single sub-client storage operation, for example to load-balance a multi-stream storage operation, to perform a multi-stream storage operation across multiple storage operation cells, etc. In some embodiments, this index information may be copied to some or all media management component indices responsible for the storage operation. For example, if three media management components each processed one or more streams associated with a sub-client storage operation, the streaming manager or other component of a particular media management component may communicate the index information of that media management component to the other two media management components so that each of the three media management component could have a complete index tracking the association of all streams of data stored on various storage devices throughout the storage management system. Alternatively, in some embodiments, once the storage operation is complete, the streaming manager or other component of two of the media management components may communicate their index information to the third media management component (thus creating a single complete copy of the metadata and other information at the third media management component) and delete their own index information, for example in order to optimize index space utilized across the system. In some embodiments, a storage management component may communicate with media management components regarding the identity, address, or other identifier of other media management components in the system.

For example, if a streaming manager at a first media management component determined that insufficient resources existed under the control of that media management component to perform all or part of a particular storage operation, the streaming manager may communicate this information and receive in return an identifier associated with another media management component (in the same or another storage operation cell) able to handle all or part of the particular storage operation including any other information necessary to coordinate the storage operation such as security or other access protocol information, firewall-related information (ports, passwords, certificates, identifiers, etc.), network pathways or other network-related information, storage device information, client information, etc.

Thus, while various subsets of data may be stored on a plurality of storage devices across one or more storage operation cells, the data is easily tracked and accessible using media management component indices or other indices (such as storage manager indices in some embodiments).

Figure 6:
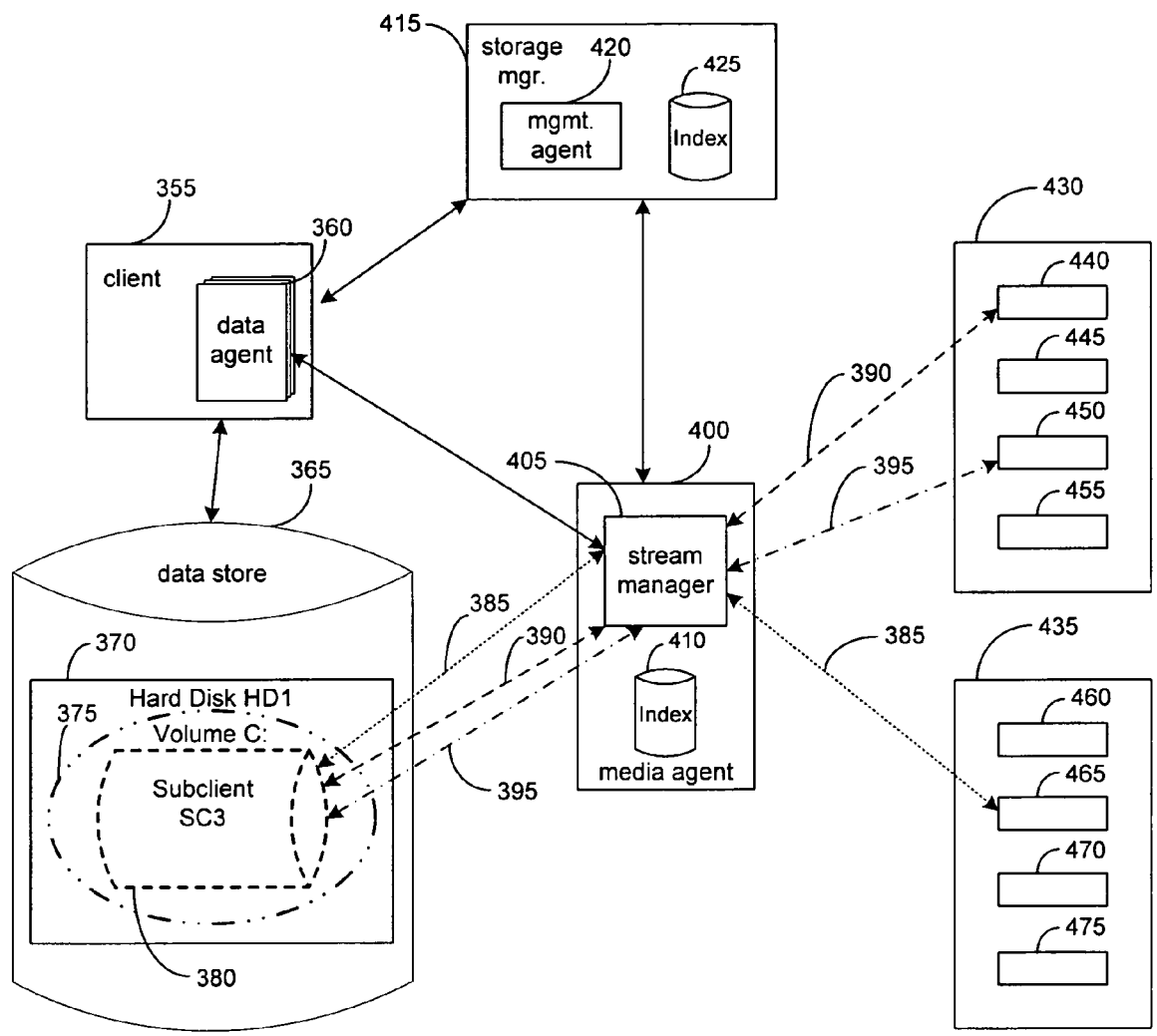
FIG. 6 is a block diagram of a storage operation cell performing multi-stream storage operations on electronic data according to an embodiment of the invention.

FIG. 6 presents a block diagram of a storage operation cell performing multi-stream storage operations on electronic data according to an embodiment of the invention. As shown, the storage operation cell contains a number of components and may include a storage manager 415 containing a management agent 420 and a storage manager index 425, a client 355 containing a data agent 360, a client data store 365 including a hard disk HD1 370 logically divided into a volume C: 375 and a sub-client SC3 380, a media management component 400 including a stream manager 405 and a media management component index 410, a first storage device 430, and a second storage device 435, for example a first tape library and a second tape library.

The components may be configured to perform multi-stream storage operations from sub-client SC3 380. For example, the storage manager 415 may schedule or otherwise direct client 355 regarding performance of a storage operation, such as a storage operation associated with a storage policy stored in storage management component index 425. Thus, management agent 420 may communicate storage policy information and other storage preferences to data agent 360 regarding the storage operation, for example, identifying the electronic data on which the storage operation should be performed, indicating that sub-client SC3 380 contains such electronic data, identifying media agent 400 as the media management component for the storage operation, identifying the storage devices used for the storage operation, such as one or both of storage devices 430 and 435, indicating that the storage operation can be performed using multiple streams, describing how the electronic data should be stored, for example as compressed or encrypted electronic data, indicating that the electronic data should be retained for a specified time period, etc. Management agent 420 may also communicate storage policy information and other storage preferences to media management component 400, for example to stream manager 405.

For example, management agent 420 may direct data agent 360 to initiate a backup operation of data on sub-client SC3 380 to storage devices 430 and 435 using three streams via media management component 400. Data agent 360 or another system component may analyze characteristics of sub-client SC3 380 and other characteristics of the storage system to dynamically create three subsets of the data stored in sub-client SC3 380. For example, data agent 360 analyzes the items in sub-client SC3 380 according to item size and type, and also analyzes the network pathways between the client 355 and the media management component 400, as well as between the client and the storage devices 430 and 435 as appropriate. In some embodiments, stream manager 405 may perform a portion of this analysis in communication with data agent 360. In some embodiments, stream manager 405 performs the sub-client and storage system analysis instead of data agent 360.

The sub-client SC3 380 may be divided into three subsets and a data pipe is opened allocating a stream 385, 390, and 395 to each subset. Chunks of data are encapsulated with metadata and sent via streams 385, 390, and 395 to media management component 400. Stream manager 405 or another component of media management component 400 may manage the transfer of data from the sub-client SC3 380 to the storage devices 430 and 435. For example, media management component 400 may determine that the streams should be spread across two storage devices due to considerations such as media availability, connection bandwidth, future storage operation requirements, etc. Thus, stream 390 is written to drive 440 and stream 395 is written to drive 450 in storage device 430, while stream 385 is written to drive 465 of storage device 435. Drives 445 and 455 of storage device 430, as well as drives 460, 470, and 475 of storage device 435, remain available for additional storage operations.

The system also updates the media management index 410 with the metadata and other information generated by each stream of data. Thus, media management index 410 may store associations between the various streams and their locations on the storage devices, the association of the various streams with sub-client SC3 380, the time and date of the storage operation, and other information as further described herein.

Figure 7:
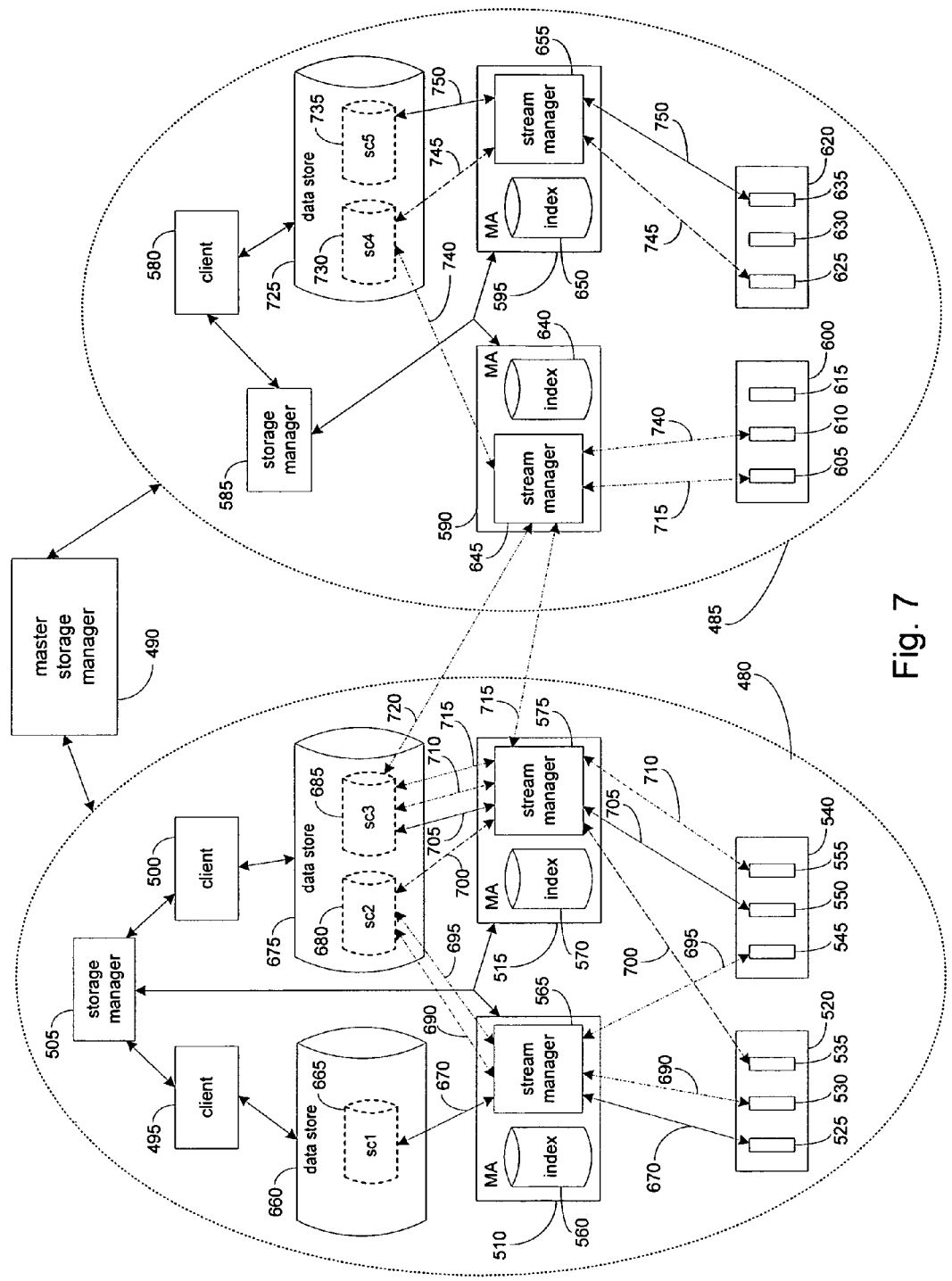
FIG. 7 is block diagram of a plurality of storage operation cells performing multi-stream storage operations on electronic data according to an embodiment of the invention.

FIG. 7 presents a block diagram of a plurality of storage operation cells performing multi-stream storage operations on electronic data according to an embodiment of the invention. As shown, FIG. 7 may include a first storage operation cell 480 and a second storage operation cell 485 arranged in a hierarchy and in communication with a master storage manager 490. The storage operation cells 480 and 485 include several clients 495, 500, and 580 in communication with one or more storage management components 505 and 580, one or more client data stores 660, 675, and 725, one or more media management components 510, 515, 590, and 595, and one or more storage devices 520, 540, 600, and 620.

The components are configured to perform multi-stream storage operations from sub-clients SC1 665, SC2 680, SC3 685, SC4 730 and SC5 735. For example, the storage manager 415 may schedule or otherwise direct client 495 regarding performance of a storage operation for sub-client SC1 665, and communicates storage policy information and other storage preferences to client 495 (for example to a data agent at client 495) regarding the storage operation. The system determines that the storage operation, for example a backup operation, will be performed using a single stream 670 to a drive 525 of storage device 520 and via media management component 510. In some embodiments, a single stream may be used due to a failure of a system check for multi-streaming resources, for example if client 495 does not support multi-streaming. Thus, data from sub-client 665 encapsulated and streamed along with metadata describing the data to the drive 525 in storage device 520. The system may also update the media management component index 560 with the metadata and other information generated by the storage operation as further described herein.

As another example, the storage manager 415 (or other system component, for example the master storage manager 490) may schedule or otherwise direct client 500 regarding performance of one or more storage operations for sub-client SC2 680, and communicates storage policy information and other storage preferences to client 500 regarding the storage operation. The system determines that the storage operation, for example a differential backup operation, will be performed using three streams via media management components 510 and 515 to drives 530 and 535 of storage device 520, as well as to drive 545 of storage device 540. Media management components 510 and 515 may both be used to perform load balancing for the storage operation or due to characteristics of the network as further described herein.

For example, the system may analyze network characteristics and discover that it is desirable to use both media management components due an ability to increase data throughput using a network pathway in communication with one of the two media management components 510 and 515. Thus, the system divides sub-client SC2 680 into three subsets according to, for example a weighted file size analysis or by file type, etc., initializes a data pipe between sub-client SC2 680 and the storage devices 520 and 540, encapsulates the data of each subset along with related metadata, and streams the data chunk by chunk via streams 690, 695, and 700. The system also updates the media management component index 560 with the metadata and other information generated by the storage operation as further described herein. In some embodiments, media agent 510 communicates its index information to media agent 515 and media agent 515 communicates its index information to media agent 510 in order that each media agent may maintain a full copy of the index data regarding storage of the streams for sub-client SC2 680. In other embodiments, one of the media agents may communicate its index information regarding the storage operation to the other (thus giving the other media management component a full copy of the index data regarding storage of the streams for sub-client SC2 680) and then subsequently delete its own index information regarding the storage operation in order to conserve index space, etc. as further described herein.

As yet another example, the storage manager 415 (or other system component, for example the master storage manager 490) may schedule or otherwise direct client 500 regarding performance of one or more storage operations for sub-client SC3 685, and communicates storage policy information and other storage preferences to client 500 regarding the storage operation. The system determines that the storage operation, for example another backup operation, will be performed using three streams via media management component 515. While the data agent of client 500 and the stream manager 575 of media management component 515 are identifying and analyzing characteristics of the network and network resources, the system determines that only two drives, drive 550 and drive 555 of storage device 540, are available within the first storage operation cell 480 to perform the storage operation and that these drives will each only support a single stream of data during the storage operation. Thus, a third drive or other storage location is required if the system is to perform the storage operation with three streams as is desirable. As another example, the system might determine that additional resources are required if a storage device in a particular storage operation cell, such as storage device 540 were unavailable due to hardware failure, lack of available media space, network connectivity issues, or for other reasons.

In some embodiments, stream manager 575 communicates this information to storage management component 505 which in turn contacts master storage manager 490 regarding the availability and characteristics of additional resources to support the multi-streaming operation for sub-client SC3 685. Master storage manager 490 may conduct its own analysis of available network resources in other cells by consulting its own index (not shown), by communicating with other master storage managers in a hierarchy of master storage managers, by communicating with other storage management components in other cells, for example with storage manager 585 in the second storage operation cell 485, or other system components.

Master storage manager 490 thus determines that additional resources are available in the second storage operation cell 485 and communicates this information to stream manager 475 either directly, or via management component 505. For example, master storage manager 490 may communicate the network address or other identifier of media management component 590 or storage device 600 in the second storage operation cell, access protocols or other security-related information regarding performing storage operations to the second storage operation cell 485, firewall-related information as necessary, and other information required for performing storage operations between storage operation cells.

The system may dynamically divide sub-client SC3 into three subsets as further described herein and performs the storage operation via streams 705 and 710 to the drives 550 and 555 respectively of storage device 540. In some embodiments, sub-client SC3 685 communicates with stream manager 645 in the second storage operation cell via stream manager 575 in the first storage operation cell and performs the storage operation as shown with a third stream 715 to drive 605 of storage device 600 in the second storage operation cell 485. In other embodiments, sub-client SC3 685 communicates directly with stream manager 645 in the second storage operation cell and performs the storage operation as shown with a third stream 720 to media management component 590 and then to drive 605 of storage device 600 via the remaining leg of stream 715 between the media management component 590 and the storage device 600 in the second storage operation cell 485. Index data is updated as previously discussed with either stream manager 645 communicating its index information to stream manager 575 and stream manager 575 communicating its index information to stream manager 645 (either directly or via various management components 505 and 585 and/or master storage manager 490) in order to create two full copies of the index information regarding storage of the streams, or one of either stream manager 575 or stream manager 645 communicating its information to the other in order to create a single full copy of the index information regarding storage of the streams and deleting its own index information regarding only those streams handled by its particular media management component 515 or 590 respectively.

In addition to the storage operations being performed in the first storage operation cell 480, the second storage operation cell 485 is also configured to simultaneously perform additional multi-steam storage operations regarding its own sub-clients, for example for sub-clients SC4 730 and SC5 735. Thus, the system also performs storage operations for sub-clients SC4 730 and SC5 735 by dividing the sub-clients into subsets for streaming as required and as previously discussed, and streaming data via streams 740, 745, and 750 to drives 610, 625, and 635 respectively of storage device 600 and storage device 620.

Systems and modules described herein may comprise software, firmware, hardware, or any combination(s) of software, firmware, hardware, or other means suitable for the purposes described herein. Software and other modules may reside on servers, workstations, personal computers, computerized tablets, PDAs, and other devices suitable for the purposes described herein. Software and other modules may be accessible via local memory, via a network, via a browser or other application in an ASP context, or via other means suitable for the purposes described herein. Data structures described herein may comprise computer files, variables, programming arrays, programming structures, or any electronic information storage schemes, methods, or means, or any combinations thereof, suitable for the purposes described herein. User interface elements described herein may comprise elements from graphical user interfaces, command line interfaces, physical interfaces, and other interfaces suitable for the purposes described herein. Screenshots presented and described herein can be displayed differently as known in the art to generally input, access, change, manipulate, modify, alter, and work with information.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for performing a dynamic multi-stream storage operation to transmit data from a sub-client within a data store to one or more storage devices, the method comprising:
   subdividing at least one client storage volume into a plurality of sub-clients based on scheduled storage operations that occur on network pathways at overlapping times, wherein each sub-client comprises one or more folders in the storage volume;
   receiving a request for a storage operation to transmit data from a first of the sub-clients to one or more storage devices, wherein the storage operation does not prohibit a multi-stream storage operation;
   analyzing characteristics of two or more streaming communication paths, wherein the analyzed characteristics comprise bandwidth of network pathways, existing network load, and predicted network load and determining whether the two or more streaming communication paths are available to perform the storage operation based on the analyzed characteristics;

analyzing characteristics associated with the first sub-client by identifying folders based on file type in the folders, and by weighting the folders based on the amount of data in the folders;

dynamically subdividing the folders in the first sub-client into two or more subsets to perform the storage operation with the two or more streaming communication paths, based at least in part on the file type in the folders, the weighting associated with the folders, and an impact of the other scheduled storage operations;

allocating each of the two or more subsets to a respective one of the two or more streaming communications paths based at least in part on the analyzed characteristics of the two or more streaming communication paths and on the weighting associated with the folders;

performing the storage operation by transmitting the data from each of the two or more subsets of the first sub-client to the one or more storage devices via the respective streaming communications paths to which each of the subsets has been allocated; and storing the transmitted data from each of the two or more subsets of the first sub-client on the one or more storage devices;

wherein at least one of the two or more streaming communication paths extends between two storage operation cells, wherein the two storage operation cells are part of a hierarchically organized system comprising a master storage manager and a group of storage operation cells, wherein each storage operation cell in the group of storage operation cells is hierarchically subordinate to the master storage manager and includes at least a storage manager for coordinating and controlling storage management operations within the storage operation cell, and wherein the hierarchical organization facilitates system security between storage operation cells;

conducting, by the master storage manager, an analysis regarding the availability and characteristics of additional network resources for supporting a multi-stream storage operation by communicating with the storage managers in the group of storage operation cells; and communicating, by the master storage manager, security-related information between the storage operation cells, wherein the security-related information includes at least one of access protocol information, firewall information, a port to use, a password, and a certificate, and wherein the security-related information is required to perform storage operations between the storage operation cells, wherein the determining whether the two or more streaming communication paths are available further includes determining whether a transmission time threshold is exceeded by performing a multi-stream storage operation only over one streaming communication path.

2. The method of claim 1 wherein the analyzing characteristics associated with the first sub-client data stored in the first sub client further includes analyzing a size of the data stored in the sub-client.

3. The method of claim 1 wherein the analyzing characteristics associated with the first sub-client further includes analyzing the first sub-client based on application type of data stored in the first sub-client.

4. The method of claim 1 wherein the analyzing characteristics associated with the first sub-client further stored in includes analyzing the data stored in the based on a user specified criteria.

5. The method of claim 1 wherein the determining whether the two or more streaming communication paths are available further includes determining that storage network resources within the streaming communication paths required for performing multi-stream storage operations are available.

6. The method of claim 1 wherein the determining whether the two or more streaming communication paths are available further includes determining that a load threshold would be exceeded by performing a multi-stream storage operation only over one streaming communication path.

7. The method of claim 1 wherein the determining whether the two or more streaming communication paths are available further includes determining the bandwidth for the network pathways within each of the streaming communication paths.

8. The method of claim 1 wherein the subdividing the folders in the first sub-client into two or more subsets further includes subdividing the folders based at least in part, on available storage network resources within the streaming communication paths.

9. The method of claim 1 wherein the subdividing the folders in the first sub-client into two or more subsets is based at least in part on an availability of the storage network resources within the streaming communication paths and on a size of the first sub-client.

10. The method of claim 1 wherein the subdividing the folders in the first sub-client into two or more subsets is based at least in part on a capacity of the storage network resources within the streaming communication paths.

11. The method of claim 1 wherein the subdividing the folders in the first sub-client into two or more subsets is based at least in part on a transmission time of data associated with the first sub-client.

12. The method of claim 1 wherein the subdividing the folders in the first sub-client into two or more subsets is based at least in part on a number and receiving capacity of the one or more storage devices that receive data from the streaming communication paths.

13. The method of claim 1 wherein the allocating each of the two or more subsets to a respective one of the two or more streaming communication paths is performed dynamically and is based at least in part on a number of the subsets of the first sub-client.

14. A method for performing a multi-stream storage operation in a data storage system, the method comprising:

subdividing at least one client storage volume into a plurality, of sub-clients based on scheduled storage operations that occur on network pathways at overlapping times, wherein each sub-client comprises one or more folders in the storage volume;

receiving a request for a storage operation to transmit data from a first of the sub-clients to one or more storage devices, wherein the storage operation does not prohibit a multi-stream storage operation;

analyzing a first characteristic of a first streaming communication path and determining whether the first streaming communication path is available to perform the storage operation based on the analyzed first characteristic;

analyzing a second characteristic of a second streaming communication path and determining whether the second streaming communication path is available to perform the storage operation based on the analyzed second characteristic;

analyzing characteristics associated with the first sub-client by identifying folders based on file type in the folders, and by weighting the folders based on the amount of data in the folders;

dynamically dividing the folders in the first sub-client into two or more subsets to perform the storage operation with the first streaming communication path and the second streaming communication path, based at least in part on the file type in the folders, the weighting associated with the folders, and an impact of the other scheduled storage operations;

associating a first subset of the two or more subsets to the first streaming communication path based at least in part on the characteristics of the streaming communication paths and on the weighting associated with the folders;

associating a second subset of the two or more subsets to the second streaming communication path based at least in part on the characteristics of the streaming communication paths and on the weighting associated with the folders; and performing the storage operation by transmitting data from each of the two or more subsets of the first sub-client to one or more storage devices via the respective streaming communications path to which each of the subsets has been associated;

wherein at least one of the streaming communication paths extends between two storage operation cells in a hierarchically organized system comprising a master storage manager and a group of storage operation cells, wherein each storage operation cell in the group of storage operation cells is hierarchically subordinate to the master storage manager and includes at least a storage manager for coordinating and controlling storage management operations within the storage operation cell;

conducting, by the master storage manager, an analysis regarding the availability and characteristics of additional network resources for supporting a multi-stream storage operation by communicating with the storage managers in the group of storage operation cells; and communicating, by the master storage manager, security-related information between the storage operation cells, wherein the security-related information is required to perform storage operations between the storage operation cells, and wherein the security-related information includes at least one of access protocol information, firewall information, a port to use, a password, and a certificate, wherein the determining whether the second streaming communication path is available further includes determining whether a transmission time threshold is exceeded by performing a multi-stream storage operation only over the first streaming communication path.

15. A method for performing a multi-stream storage operation to transmit data from a sub-client within a data store to one or more storage devices, the method comprising:

subdividing at least one client storage volume into a plurality of sub-clients based on scheduled storage operations that occur on network pathways at overlapping times, wherein each sub-client comprises one or more folders in the storage volume;

analyzing characteristics associated with a first of the sub-clients by identifying folders based on file type in the folders, and by weighting the folders based on the amount of data in the folders;

dynamically subdividing the folders in the first sub-client into two or more subsets to perform the storage operation with two or more streaming communication paths, based at least in part on characteristics associated with the two or more streaming communication paths, including characteristics related to the network pathways, and at least the file type in the folders, the weighting associated with the folders, an impact of the other scheduled storage operations, and a determination whether a transmission time threshold is exceeded by performing a multi-stream storage operation only over one streaming communication path;

allocating each of the two or more subsets to a respective one of the two or more streaming communications paths based on characteristics associated with the two or more streaming communication paths, including characteristics related to the network pathways, and on the weighting associated with the folders; and performing the storage operation by transmitting data from each of the two or more subsets of the first sub-client to the one or more storage devices via the respective one of the streaming communications paths to which each of the subsets has been allocated;

wherein at least one of the two or more streaming communication paths extends between two storage operation cells in a hierarchically organized system comprising a master storage manager and a group of storage operation cells, wherein each storage operation cell in the group of storage operation cells is hierarchically subordinate to the master storage manager and includes at least a storage manager for coordinating and controlling storage management operations within the storage operation cell;

conducting, by the master storage manage, an analysis regarding the availability and characteristics of additional network resources for supporting a multi-stream storage operation by communicating with the storage managers in the group of storage operation cells; and communicating, by the master storage manager, security-related information between the storage operation cells, wherein the security-related information is required to perform storage operations between the storage operation cells, and wherein the security-related information includes at least one of access protocol information, firewall information, a port to use, a password, and a certificate.

* * * * *

UNITED STATES PATENT AND TRADEMARK OFFICE
CERTIFICATE OF CORRECTION

| | | |
|---|---|---|
| PATENT NO. | : 7,975,061 B1 | Page 1 of 1 |
| APPLICATION NO. | : 11/269520 | |
| DATED | : July 5, 2011 | |
| INVENTOR(S) | : Parag Gokhale et al. | |

It is certified that error appears in the above-identified patent and that said Letters Patent is hereby corrected as shown below:

At Page 3, (Item 56) References Cited, Column 2, Line 4, under Other Publications, change "Mar. 3," to --Mar. 5,--.

At Column 2, Line 28, change "Comm Vault" to --CommVault--.

At Column 2, Line 29, change "Comm Vault" to --CommVault--.

At Column 6, Line 31, change "Comm Vault" to --CommVault--.

At Column 6, Line 32, change "Comm Vault" to --CommVault--.

At Column 6, Line 42, change "Comm Vault" to --CommVault--.

At Column 23, Lines 55-56, in Claim 2, after "first sub-client" delete "data stored in the first sub client".

At Column 23, Line 56, in Claim 2, change "the data" to --data--.

At Column 23, Line 63, in Claim 4, after "further" delete "stored in".

At Column 23, Line 64, in Claim 4, after "data" delete "stored".

At Column 23, Line 64, in Claim 4, change "based" to --folders based--.

At Column 24, Lines 43-44, in Claim 14, change "plurality," to --plurality--.

Signed and Sealed this
Fifth Day of June, 2012

David J. Kappos
*Director of the United States Patent and Trademark Office*